United States Patent [19]

Ishizuka

[11] 4,385,881
[45] May 31, 1983

[54] ULTRAHIGH PRESSURE APPARATUS

[76] Inventor: Hiroshi Ishizuka, 19-2 Ebara 6-chome, Shinagawa-ku, Tokyo, Japan

[21] Appl. No.: 252,177

[22] Filed: Apr. 8, 1981

[30] Foreign Application Priority Data

Apr. 18, 1980 [JP] Japan .................. 55-50431

[51] Int. Cl.³ .............................. B30B 11/32
[52] U.S. Cl. ...................... 425/77; 264/109
[58] Field of Search ............... 425/77; 264/84, 109

[56] References Cited

U.S. PATENT DOCUMENTS

| 2,941,247 | 6/1960 | Bundy | 425/77 |
| 2,941,248 | 6/1960 | Hall | 425/77 |
| 3,313,004 | 4/1967 | Vahldiek et al. | 425/77 |
| 3,350,743 | 11/1967 | Ishizuka | 425/77 |
| 3,365,751 | 1/1968 | Ishizuka | 425/77 |
| 3,727,028 | 4/1973 | Kuratomi | 425/77 X |
| 3,988,087 | 10/1976 | Ishizuka | 425/77 |
| 4,097,208 | 6/1978 | Ishizuka | 425/77 |

FOREIGN PATENT DOCUMENTS

| 46-7998 | 2/1971 | Japan | 425/77 |
| 47-48069 | 12/1972 | Japan | 425/77 |
| 1213714 | 11/1970 | United Kingdom . | |

Primary Examiner—Philip E. Anderson
Attorney, Agent, or Firm—Lalos, Leeds, Keegan, Lett & Marsh

[57] ABSTRACT

An improved ultrahigh pressure apparatus which comprises; a pair of opposed frustoconical punches, an annular die which has a central bore therethrough formed straight-cylindrical at least partially at an inner portion and which is placed between and in alignment with said punches, a rigid hollow cylinder which is placed in a circumferential contact with the straight cylindrical bore face of the die, and a pair of gaskets of a readily deformable material which are each placed around a conical face of punches and adjacent to a bore face portion of the die outside the rigid cylinder and to an orifice of said cylinder, which apparatus is characterized in that said rigid hollow cylinder has a bore face formed substantially quarter-circular or quarter-elliptical, in a radial section taken along an axis thereof, starting at either axial end and ending at a central portion thereof.

6 Claims, 6 Drawing Figures

FIG. I
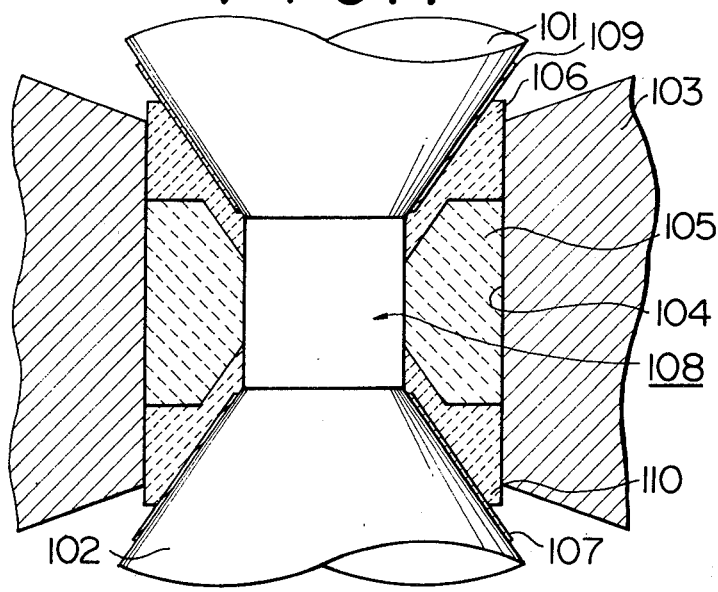
FIG. 2
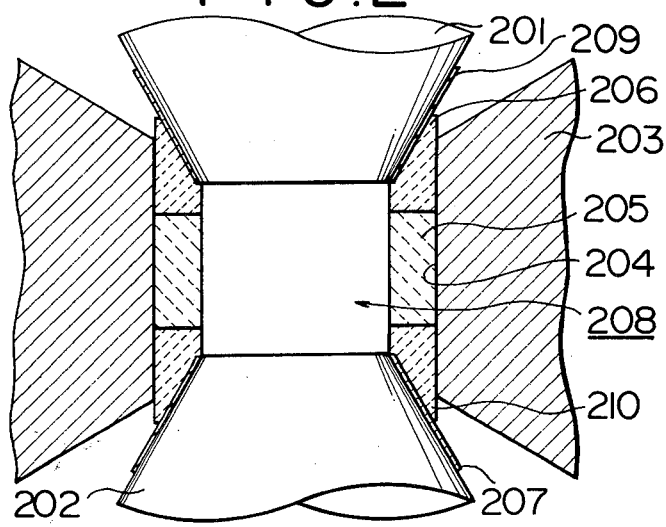

ULTRAHIGH PRESSURE APPARATUS

The present invention relates to an improved ultrahigh pressure apparatus, particularly to such an apparatus as ensures a reproducible application of a pressure in excess of 60 kilobars to an increased volume of specimen at a substantially raised load efficiency.

Techniques have been developed for subjecting a reasonable volume of solid specimen to a pressure of tens of kilobars at an elevated temperature and have been adapted for years to industrial production of such useful super hard materials as diamond and cubic boron nitride (CBN) through a catalytic conversion from more common phases of graphite and hexagonal boron nitride, respectively. Prevailingly employed apparatus are of so-called piston-cylinder type, which basically comprise a pair of opposed tapered punches (pistons) and an annular die (cylinder) placed between and in alignment with said punches.

One typical apparatus of this category, as known from U.S. Pat. No. 2,941,248 Specification for example, is often referred to as "belt" apparatus, which essentially uses a pair of tapered punches and an annular die, each, as a unique surface formation, together with a gasket inserted between thus formed opposing faces of the elements. The apparatus is so designed that when the punches move towards the die for squeezing a specimen contained in the latter the die efficiently receives from each punch through gaskets axial compressive force to set off to a safety degree axial tensile stresses within the die material which are inevitably yielded by the pressure working on the bore face of die and would eventually cracks the die laterally; so that the die may stand undamaged under a pressure condition beyond the proper strength of the die material.

Disadvantageously, this arrangement can accomodate only a limited amount of specimen relative to the overall volume of the die, which essentially consists of cemented tungsten carbide, one of the most compression resistant material industrially available so far. As the mass of article prepared of this material increases, as often experienced in the industry, the article inevitably tends to exhibit a strength decreasing towards the core. Such strength irregularity has been the critical reason for technically impossible manufacture of die element of increased dimensions. No other materials are available for the die because of strength too small to resist forces conducted substantially unbuffered onto the bore face from a core of the bore where a pressure generated reaches the order of 50 kilobars or more.

Thus apparatus of this piston-cylinder type achieve only a poor load efficiency relative to the pressure attainable and specimen volume to be treated. This is especially remarkable when the apparatus is designed for a pressure in excess of 60 kilobars, which is possible only at a considerable expense of specimen accomodation.

A substantially improved efficiency of specimen accomodation has been attainable with an apparatus of another piston-cylinder type, which essentially uses a rigid hollow cylinder of hard sintered alumina, placed on a straight-cylindrical bore face of die successfully made of steel, as known from U.S. Pat. No. 3,350,743 to the same Applicant as the instant case. Being subjected to a reasonably reduced force by the intervening alumina cylinder even when a pressure is reached inside the bore up to the order of 50 kilobars, the die can consist favorably of some kind of hardened steels, which are mechanically less strong but preferred because of their by better strength regularity, machinability and economy. With such material available, a die of this type apparatus can be made to an increased volume for accomodation of a substantially increased amount of specimen to be treated.

It is essential for such apparatus which use the alumina cylinder to keep the latter from any deformation during compressive work so as to ensure its function as a pressure buffer for the die. By the arrangement shown in U.S. Pat. No. 3,350,743 the alumina cylinder tends to axially extend and crack to be ineffective as the cylinder of an increased such length is used for a pressure production on the order of 50 kilobars or more. This means such arrangement allows only a rather shortened cylinder to be applicable to a pressure of this order, and, in the end, a die with a rather short bore alone is effectively used for a catalytic conversion to diamond or CBN. U.S. Pat. No. 4,097,208 has provided another improvement in the arrangement of this piston-cylinder type. The arrangement allows to use an alumina cylinder of a similar property to above but of an increased axial length. Here an alumina cylinder has a trapezoidal cross section in the place of conventional rectangular, with a conical face which is so formed as extending inwards from each orifice and as in a substantial parallel with the conical face of neighboring punches. As compressed by the punches through gaskets inserted, the alumina cylinder is subjected to such a better balanced stress condition than conventional as to effectively suppress deformation of axially elongated alumina cylinder, thus ensuring its function to decrease the force to be conducted to the die.

In this case, however, stress conditions within the alumina material cylinder becomes unbalanced about the borders between the conical and straight-cylindrical portions as a generated pressure inside the bore is increased over 60 kilobars, resulting in lateral cracking there. Such failure causes an insufficient provision of compressive force to the inner straight-cylindrical portion for suppressing the axial deformation, resulting in cracks and ineffectivity of the cylinder as a pressure buffer for the die.

With such shortness in pressure resistance of the alumina cylinder, the apparatus of U.S. Pat. No. 4,097,208 is inapplicable to a pressure in excess of 60 kilobars.

Theoretically, an adaptation may be possible in which either type of piston-cylinder apparatus be successfully designed for a pressure above 60 kilobars, but only at a considerable expense of volume of specimen accomodation as well as load efficiency. No other apparatus have been ever published which would permit to treat a reasonable amount of specimen under a pressure on the order of 60 kilobars or more at an elevated temperature.

Therefore a principal object of the present invention is to provide an apparatus which can subject an increased volume of specimen to an ultrahigh pressure in excess of 60 kilobars and an elevated temperature simultaneously at a substantially improved load efficiency, based on the arrangement which essentially uses an alumina cylinder as a pressure buffer for a die, by especially improving in such function over an extended pressure range.

According to the invention there is provided an ultrahigh pressure apparatus which comprises:

a pair of opposed frustoconical punches, an annular die which has a central bore therethrough formed straight-cylindrical at least partially at an inner portion and which is placed between and in alignment with said punches, a rigid hollow cylinder which is placed in a circumferential contact with the straight cylindrical bore face of the die, and a pair of gaskets of a readily deformable material which are each placed around a conical face of punches and adjacent to a bore face portion of the die outside the rigid cylinder and to an orifice of said cylinder; which apparatus is characterized in that said rigid hollow cylinder has a bore face formed substantially quarter-circular or quarter-elliptical, in a radial section taken along an axis thereof, starting at either axial end and ending at a central portion thereof.

In the invention the alumina cylinder is essentially provided with a curved bore face, such as formed substantially either quarter-circular or quarter-elliptical, as viewed in a radial cross section taken along the axis, over a portion from each orifice to a central portion, whereby compressive forces, occurring on the bore face of the cylinder as punches move closer, yield axial compressive stresses within the cylinder material at a substantially improved efficiency, so that an increased resistance of the cylinder may be achieved against fracture and deformation and, as a result, an improved load efficiency may be performed.

In the invention an optimal pressure resistance of the alumina cylinder is obtainable with a bore face formation of half-circle, in cross section, whose diameter is substantially equal to the cylinder's axial length. Such half-circle can be replaced practically by a half-ellipsis of major axis of the cylinder's axial length, depending on geometry of tungsten carbide punches and steel die to be put together as well as volume of specimen accomodation and a maximum pressure to be attained. In the latter case the ratio major/minor axis should be favorably smaller than or equal to 2, in view of the stress buffering effect of the cylinder and the load efficiency of the apparatus.

For an easier manufacture, the cylinder may be provided with a circular flat face adjacent to the outer cylindrical face, the width of the former should not exceed 20% of the outer diameter of the cylinder, and/or with a straight-cylindrical face in a vicinity of the axial center of the bore, not in excess of 20% of the overall length of the cylinder.

Bore face thus formed are not necessarily finish-machined after sintering process.

Adjacent to each orifice of the alumina cylinder there is placed a gasket of a readily deformable material, which has a face to come in contact with the cylinder, the face being preferably formed complementary to the latter for a higher load efficiency and a better prevention of inexpectable deformation of specimen. Such bordering face, as formed to comprise a conical portion substantially parallel to the flank of punch, allows a substantially identical pressure eventually to be attained, though.

The die according to the invention does not necessarily have a bore face straight cylindrical all over the axial length of the bore as have been required for any conventional designs of this type. Instead, as far as the bore is provided with a straight-cylindrical inner portion, to which the alumina cylinder is adjacent, the die may have a rounded bore face portion, circular or elliptical in section as on the alumina cylinder, or a conical face substantially parallel to the flank of punches formed inwards from each orifice of the die bore adjacent to the inner straight-cylindrical portion. Such formation allows to supply the die with compressive force through said curved or conical portion. With the bore face efficiently eliminated of radial deformation by means of such compressive force, the die of this configuration achieves an improved circumferential support for the cylinder against its radial deformation. Thus a further higher pressure can be attained with this arrangement of partially curved or conical bore face of the die together with the circularly or elliptically curved bore face of the alumina cylinder.

The features and advantages of the invention will be better understood from the following description, taken in connection with the accompanying drawing, in which:

FIGS. 1 and 2 are vertical sectional views of the main part of two conventionally designed ultrahigh pressure apparatus utilizing the alumina cylinder;

FIGS. 3 to 6 show, each, schematically an exemplified charge assembly inside the alumina cylinder for diamond synthesis from graphite.

Figure 3:
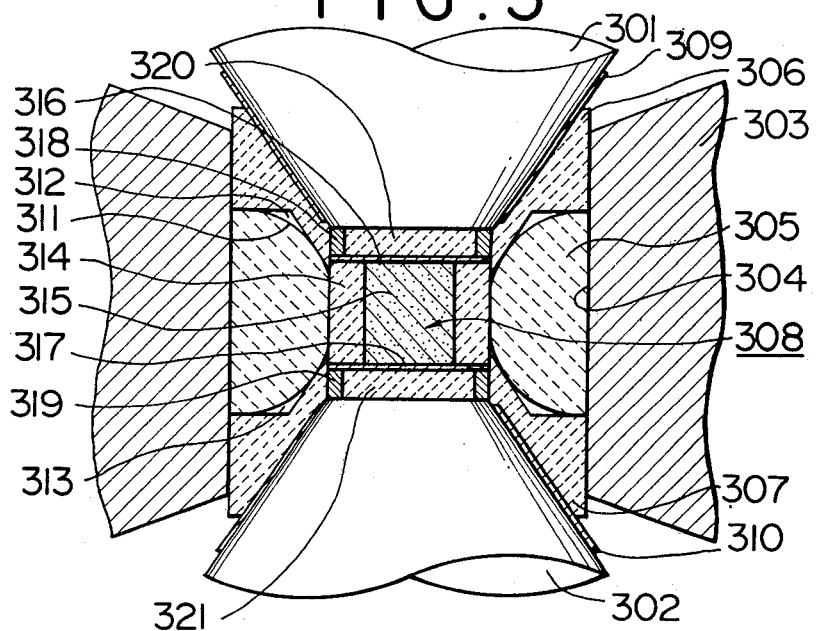
FIGS. 3 and 4 illustrate such views of first and second arrangements according to the invention, in which a novel designed alumina cylinder is employed.

In FIGS. 1 to 6 in common, a pair of frustoconical punches 101, 102, 201, 202 . . . 601, 602, respectively, made of such compression resistant material as cemented tungsten carbide (WC-Co alloy) are placed in an opposed disposition and in alignment with an annular die 103, 203 . . . 603, which consists of such hardened steel as die steel or high speed steel and is placed between the punches and has a central bore 104, 204 . . . 604. The bore is formed substantially straight-cylindrical, at least partially in an inner portion over an axial length greater than or equal to that of an alumina cylinder to be put together. The rigid hollow cylinder 105, 205 . . . 605 of an alumina material sintered to be substantially free of pores is placed adjacent to the bore face of die within the straight cylindrical portion. Gaskets 106, 107, 206, 207 . . . 606, 607 are placed around conical flanks of the punches in adjacence to the bore face outside the alumina cylinder and to each orifice of the cylinder. A cavity 108, 208 . . . 608 inside the bore of alumina cylinder serves for accomodation of reaction charge assembly.

Particularly in FIG. 1, the die 103 has a bore face formed substantially straight-cylindrical all over the axial length of the bore. The alumina cylinder 105 placed on the bore face at a middle portion shows a trapezoidal cross section: the face consists of a straight cylindrical portion inwards and an adjacent conical face on either side. A fitted protective cover 109, 110 of a thin mild-steel plate is provided on each punch 101, 102, respectively.

In FIG. 2 where an arrangement is shown particularly directed to a smaller size apparatus than in FIG. 1, diameter ratio of smaller end of the punches 201, 202 to the cylindrical bore 204 of die is considerably increased over FIG. 1, and an alumina cylinder 205 of rectangular cross section is substituted. In this figure, too, each punch 201, 202 is provided with a protective cover 209, 210 of a similar material to that in FIG. 1.

Figure 4:
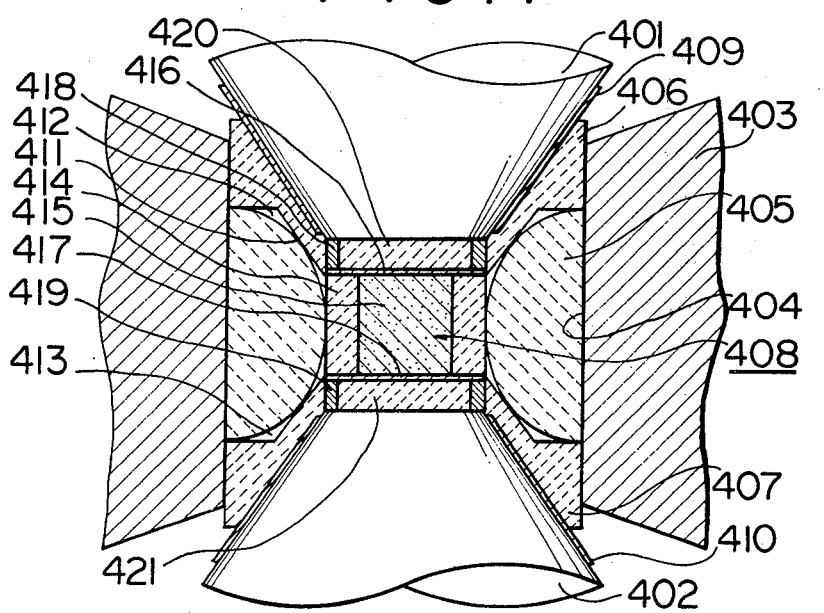
Figure 5:
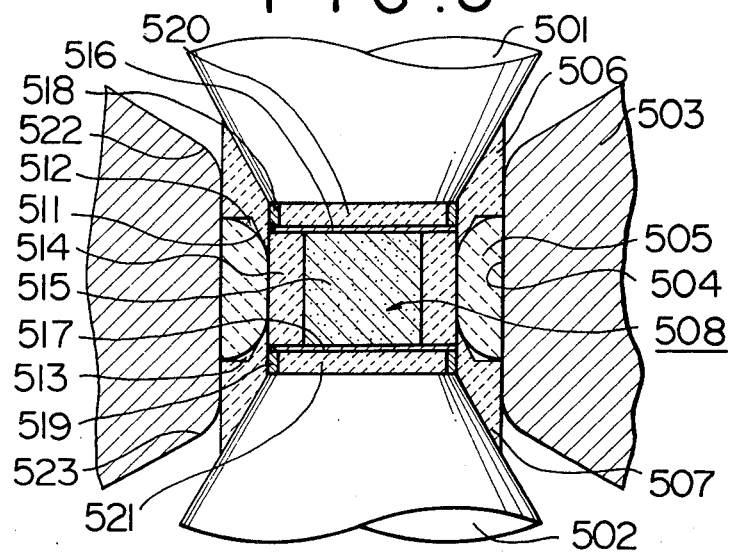
FIGS. 5 and 6 show such views of third and fourth arrangements according to the invention, in which the novel alumina cylinder is used along with a die member which is provided with a partially curved bore face.

In FIGS. 3 or 5, likewise to above figures, an annular die 303, 403 has a central bore 304, 404 formed straight-cylindrical all over the axial length. In this apparatus according to the invention, a rigid hollow cylinder 305, 405 of alumina, placed on the bore face of die, characteristically shows a curved bore formation. In FIG. 3, the cylinder as viewed in a radial cross section, exhibits a quarter-circular curvature on the bore face 311 at a portion between the short straight-cylindrical face and the flat face around each orifice of the cylinder 305. In FIG. 4, on the other hand, such cylinder 405 has a bore face 411 generally formed half-elliptical in such cross section. In both of FIGS. 3 and 4, a gasket 306, 307, 406, 407 is provided around each punch 301, 302, 401, 402 over the flank thereof. Gaskets have a circumferential face formed substantially straight-cylindrical to fit the bore of the die 303, 403, and are placed adjacent to the cylinder 305, 405 of alumina on each orifice, eventually forming small gaps 312, 313, 412, 413 between the contacting faces of the gaskets and cylinder. The two elements each have a minimum opening substantially identical to the diameter of punches at the smaller end, thus providing a cavity 308, 408 for accomodation of a generally cylindrical charge assembly therein. The assembly can be of a conventional design which consists of a fired agalmatolite tube 314, 414 to serve as a container for mixed powders 315, 415 of, for example, carbon and a flux metal such as nickel or cobalt, and sealed with a thin disk 316, 317, 416, 417 of molybdenum at either end of the tube. Such disks 316, 317, 416, 417 are arranged as adjacent to rings 318, 319, 418, 419, which is turn are in adjacent to the punches 301, 302, 401, 402, thus providing an electrial path between the punches through the specimen 315, 415 for heating the latter. Each ring is stuffed with a molded refractory 320, 321, 420, 421 in order to reduce thermal and electrical transmission to the punches from the specimen 315, 415 as heated.

Figure 6:
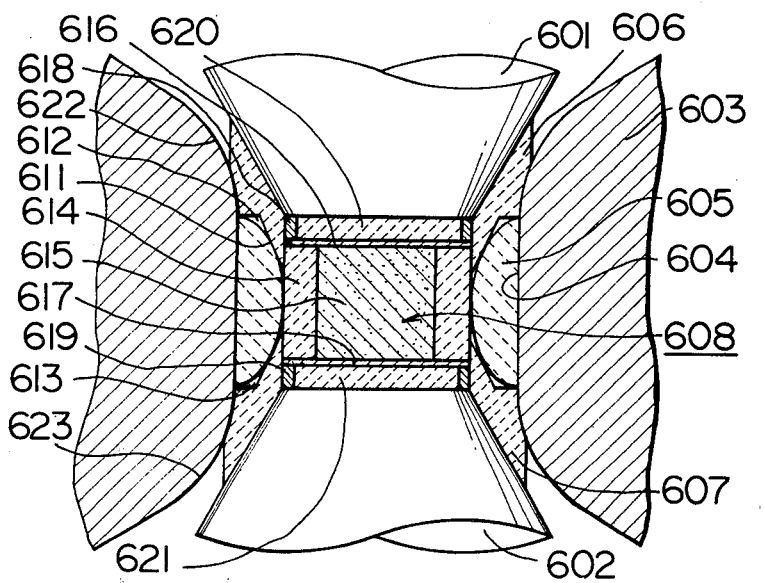

In FIGS. 5 and 6, a modification is made here in which an annular die 503, 603 has a central bore 504, 604 formed substantially straight-cylindrical at an inner portion thereof and an adjacent curved face on either side, such curvature being each connected tangentially to upper and lower conical faces of the die 503, 603. The curved face can be partial-circular in cross section. A rigid hollow cylinder 505, 605 of alumina is so placed as to be in a circumferential contact with the die 503, 603 at an inner portion of the bore within the straight cylindrical formation. In FIG. 5 particularly, the alumina cylinder has a short bore face straight-cylindrical at a middle portion thereof between a sectionally quarter-circular curved faces on each side of the portion in a substantially tangential connection. Such combined bore face formation can be replaced as in FIG. 6 by a generally half-elliptical one of a major axis of the cylinder's overall axial length. Ring-formed gaskets 506, 507, 606, 607 of a fired alumina silicate material surround each punch 501, 502, 601, 602 on the flank partially. In FIG. 5 where the die has a straight cylindrical face on the bore at either side of the alumina cylinder 505, the gaskets 506, 507, also have a circumferential face formed substantially straight-cylindrical to fitly match such bore of the die 503. Outside such cylindrical portion, the gaskets are not necessarily provided with an outer face closely to follow the die bore formation. An approximate matching is sufficient. In FIG. 6 where the die 603 has a curved face beginning at each orifice of the alumina cylinder 605, a circumferential face of gaskets 606, 607 within the die bore is shaped for a most part to closely follow the bore formation.

In both of FIGS. 5 and 6, as in FIGS. 3 or 4, the gaskets are placed as adjacent to each orifice of the alumina cylinder and the conical face of punches, eventually leaving small gaps 512, 513, 612, 613 remained unfilled which do not adversely effect. The gaskets 506, 507, 606, 607 and alumina cylinder 505, 605, each have a minimum opening of a diameter substantially identical to that of punches at the smaller end, thus providing a cavity 508, 608 for reaction charge assembly, which, as in FIGS. 3 and 4, substantially consists of an agalmatolite tube 514, 614 for containing a specimen 515, 615, sealed at either end with a molybdenum disk 516, 517, 616, 617 which is placed adjacent to a ring 518, 519, 618, 619 of mild steel stuffed with a molded refractory 520, 521, 620, 621, such ring being, in turn, in contact with each punch 501, 502, 601, 602, thus providing an electrical path between the punches through the specimen for heating, while the punches are protected against a heat as produced electrically within and conducted from the specimen as heated.

In the following examples comparative tests will be described for press loads required for producing given pressures with the apparatus as shown in FIGS. 1 to 6, as well as their durability for repeated uses. The pressures have been detected by means of discontinuity points of bismuth and barium metals in electrical resistance observed to occur under specific pressures accompanying with phase transitions. The test mode was adapted from the one described in "The Review of Scientific Instruments" Vol. 34, No. 2 (1969), pages 125~131.

Each apparatus was operated on a hydraulic press of the type shown in British Pat. No. 1,213,714.

EXAMPLE 1

The apparatus used in this run was the type as illustrated in FIG. 3, which basically comprised a pair of tungsten carbide punches tapering at 33 degrees against the axis with a flat circular face 75 mm across at the smaller end; and an annular die of steel with a central bore formed straight cylindrical of a 170 mm diameter and a 170 mm axial length. A rigid hollow cylinder on the bore face was made of alumina sintered to be substantially pore free and had dimensions of a 95 mm overall axial length, a 15 mm axial length of the central straight-cylindrical portion, a 75 mm minimum opening diameter (at such straight-cylinder), an 8 mm width of the circular flat face around each orifice of the cylinder and a 40 mm radius of the sectionally circular-arc curved face adjacent to such flat face and extending inward. The tube to be placed inside the alumina cylinder was made of a fired agalmatolite of 40 mm in I.D. and 50 mm in axial length. A gasket of fired agalmatolite was placed to fill a space within the bore of die outside the alumina cylinder, between each punch and the alumina cylinder around the opening of the cylinder, and load was applied by the punches through the gaskets.

EXAMPLE 2

In this run a rigid hollow cylinder of alumina as illustrated in FIG. 4 was used, which had an overall axial length of 110 mm and comprised a straight-cylindrical bore face of a 5 mm axial length, a circular flat face of a 5 mm width and a curved face of a quarter-elliptical section whose major axis was 105 mm long and the minor axis, 85 mm, on each side of and adjacent to the straight-cylinder. Punches, die and agalmatolite tube were substantially identical to each of corresponding elements as used in Example 1.

REFERENCE TEST 1

Load was applied for comparative purpose with an arrangement as shown in FIG. 1, in which an alumina cylinder was used which was similarly made of a pore-free alumina but of a conventional bore formation.

EXAMPLE 3

Here an apparatus was used as illustrated in FIG. 5, which basically comprised a pair of frustoconical punches of cemented tungsten carbide tapering at 30 degrees against the axis and having a flat circular face 20 mm across, and an annular die of, similarly, hardened steel with a central bore of 30 mm in diameter (at the straight-cylinder). The die had a bore face formed straight-cylindrical at an inner portion over a 22 mm length, with an adjacent curved face, circular in secton of a 5 mm radius, on either side. A rigid hollow cylinder of a sintered alumina on the bore face of die was 15 mm in overall axial length, 20 mm in minimum I.D. and had a straight-cylindrical face at an inner portion of the bore, and a curved face, sectionally quarter-circular of 5 mm radius, on each side in a substantially tangential connection therewith. An agalmatolite tube was 12 mm in axial length and 12 mm in I.D.

EXAMPLE 4

An arrangement in FIG. 6 was used. A die had a central bore face which consisted of an inner portion formed straight-cylindrical of 30 mm diameter and of 18 mm axial length and an outer portion on each side, curved, in cross section, circularly at a radius of 15 mm in tangential connection to the inner portion. An alumina cylinder had a bore face formed substantially half-elliptical which is 18 mm in major axis (identical to the overall axial length of the cylinder) and 5 mm in minor axis (identical to the maximum thickness). Punches and an agalmatolite tube were substantially same as those used in Example 3.

REFERENCE TEST 2

For a comparative purpose with the arrangements in Examples 3 and 4, an apparatus was used as illustrated in FIG. 2 which comprised an annular die and an alumina cylinder, both, of a conventional design, and pressure calibration test were conducted for punch load requirement. The die had a central bore, formed straight-cylindrical of 30 mm diameter all over the axial length of 36 mm. Starting at each orifice the bore had a conical facetapering inwards at an angle of 60 degrees against the axis. Punches and charge assembly were substantially same as in Examples 3 and 4.

Load readings of the hydraulic press on which the apparatus were mounted are given in the table below with Examples 1 to 4 along with Reference Test 1 and 2.

| Run | 25.4 Kb | 55 Kb | 77 Kb | Durability (at 55 Kb) |
| --- | --- | --- | --- | --- |
| Example 1 | 2800 tons | 6500 tons | 10000 tons | >700 runs |
| Example 2 | 3000 | 7000 | 11000 | >700 |
| Ref. Test 1 | 3000 (approx.) | 7600 | unattainable | 400 |
| Example 3 | 140 | 300 | 420 | 1500 (approx.) |
| Example 4 | 150 | 330 | 460 | 2000 (approx.) |
| Ref. Test 2 | 120 | 250 | >400 (unattainable) | 600 (approx.) |

As obvious from the description above, the apparatus according to the invention essentially uses a rigid hollow cylinder of a novel design in which the bore face comprises a curved portion, either of a quarter-circular or quarter-elliptical in cross section, starting at each orifice with or without a circular flat face around, the ratio major/minor axis in the case of elliptical formation not exceeding 2.

Thus arranged, the apparatus of the invention is advantageous in many ways. A few of such examples are:
1. An ultrahigh pressure, particularly in excess of 70 kilobars, can be readily attainable;
2. An improved pressure reproduction has been secured owing to eliminated instability of press load efficiency depending on irregular quality of alumina material to form the rigid hollow cylinder;
3. The die member exhibits a substantially improved durability, to be effective for an increased number of runs repeatedly; and
4. As employed in combination of the rigid hollow cylinder of the invention along with a die of curved bore formation set forth herein, the latter exhibits a further improved durability.

It be noted here that the term "section(ally)" used to refer to formation of each element contained in the specification should be appropriately understood as radial one taken along the axis, even without definite reference.

I claim:
1. An ultrahigh pressure apparatus comprising: a pair of opposed frustoconical punches, an annular die whose bore face includes an innermost portion of substantially straight-cylindrical configuration and placed between and in alignment with the punches, a rigid hollow cylinder placed in circumferential contact with said straight-cylindrical portion of the bore face, gaskets of readily deformable material placed around the conical face of the punches and abutting the cylinder and the outer portion of the bore face of the die on each side of the cylinder, said rigid cylinder having a curved bore face which exhibits, at a radial cross section of the cylinder taken along the axis, a contour selected from quarter-circular and quarter-elliptical contours between each end and the center of said axis, and said cylinder exhibits a diameter at the minimum opening thereof substantially equal to that of the punches at the smaller end thereof.
2. The apparatus according to claim 1, in which said quarter-circular contour of the rigid cylinder is curved at a radius substantially equal to half the axial length of the axis.
3. The apparatus according to claim 1, in which said quarter-elliptical contour of the cylinder exhibits a major axis substantially equal to the overall axial length of the cylinder.
4. The apparatus according to claim 1, in which said quarter-elliptical contour of the cylinder exhibits major and minor axes whose ratio is not in excess of two.
5. The apparatus according to claim 1, in which said cylinder is substantially made of alumina material sintered to be substantially free of pores.
6. The apparatus according to claim 1, in which said die is made of such hardened steel as die steel or high speed steel.

* * * * *